United States Patent [19]
Louie et al.

[11] 4,023,202
[45] May 10, 1977

[54] TELEVISION TRACKING SYMBOL GENERATOR

[75] Inventors: Anthony C. H. Louie; Robert E. Munn, both of San Diego, Calif.

[73] Assignee: The United States of America as represented by the Secretary of the Navy, Washington, D.C.

[22] Filed: Dec. 24, 1975

[21] Appl. No.: 644,289

[52] U.S. Cl. .............................................. 358/125
[51] Int. Cl.² ......................................... H04N 3/16
[58] Field of Search .............................. 178/6-8, 178/DIG. 21; 358/125, 108, 109

[56] References Cited
UNITED STATES PATENTS

| | | | |
|---|---|---|---|
| 3,010,024 | 11/1961 | Barnett et al. | 178/DIG. 21 |
| 3,775,558 | 11/1973 | Moulton | 178/DIG. 21 |

*Primary Examiner*—Richard Murray
*Attorney, Agent, or Firm*—R. S. Sciascia; G. J. Rubens; T. M. Phillips

[57] ABSTRACT

A television tracking symbol generator for use in a non-imaging seeker to provide basic flight test performance that can be instantly understood by watching a conventional television real time display of the airborne TV monitor or subsequent display by means of a video tape recording made during the test. The display contains the dynamic and pictorial rendition of the target movement, the terrain, the weather conditions, the seeker's aim point, the stabilized platform's aim point and the target's signal strength as received at the seeker. All the key performance data about the seeker are integrated and correlated in the TV picture.

6 Claims, 13 Drawing Figures

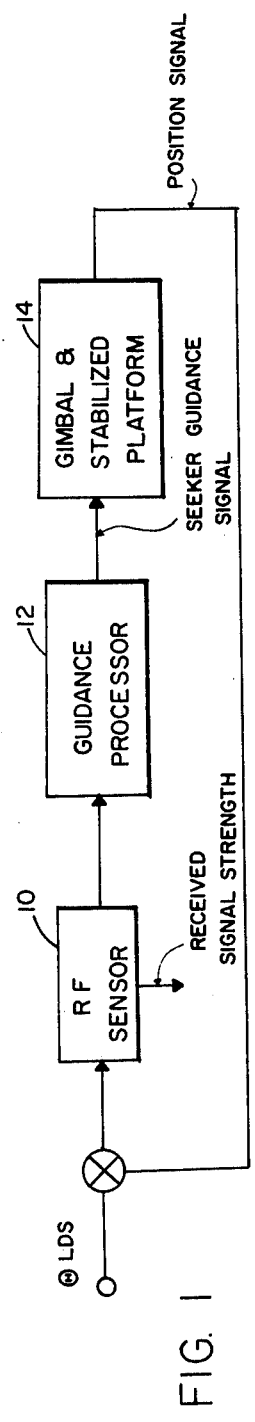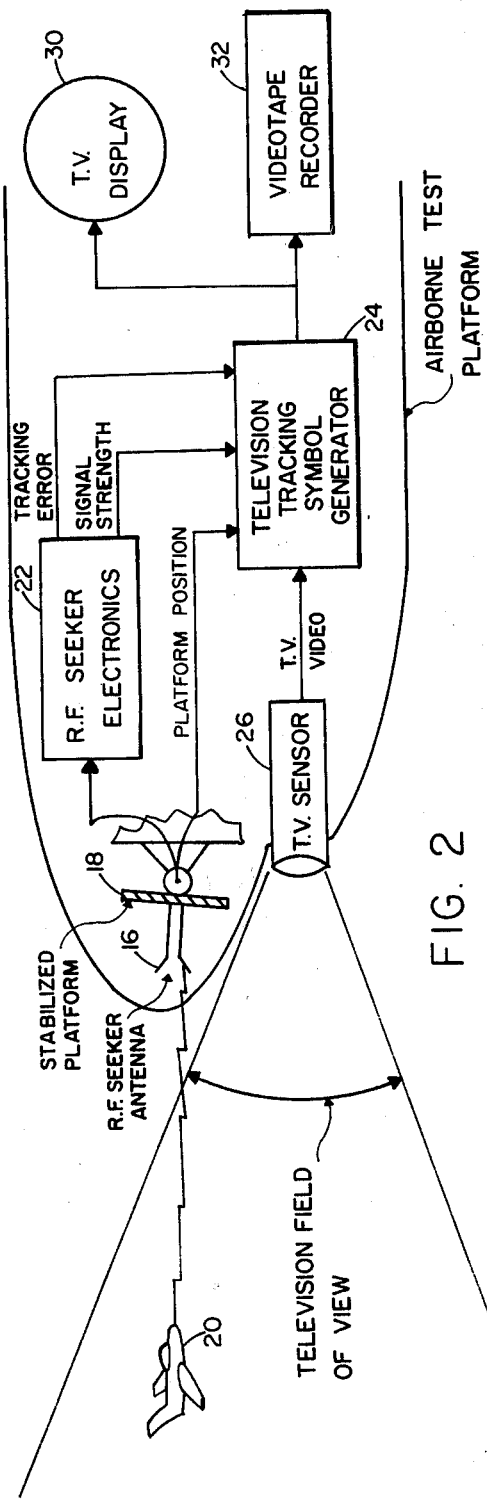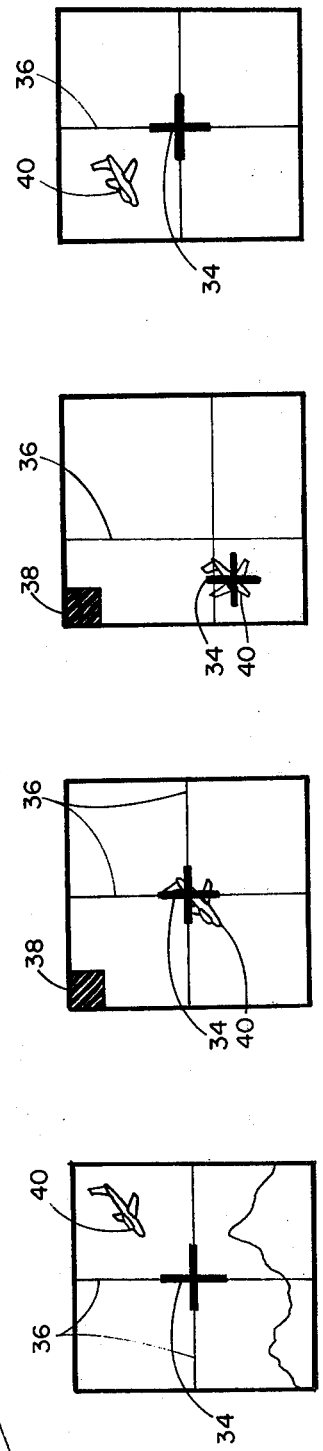

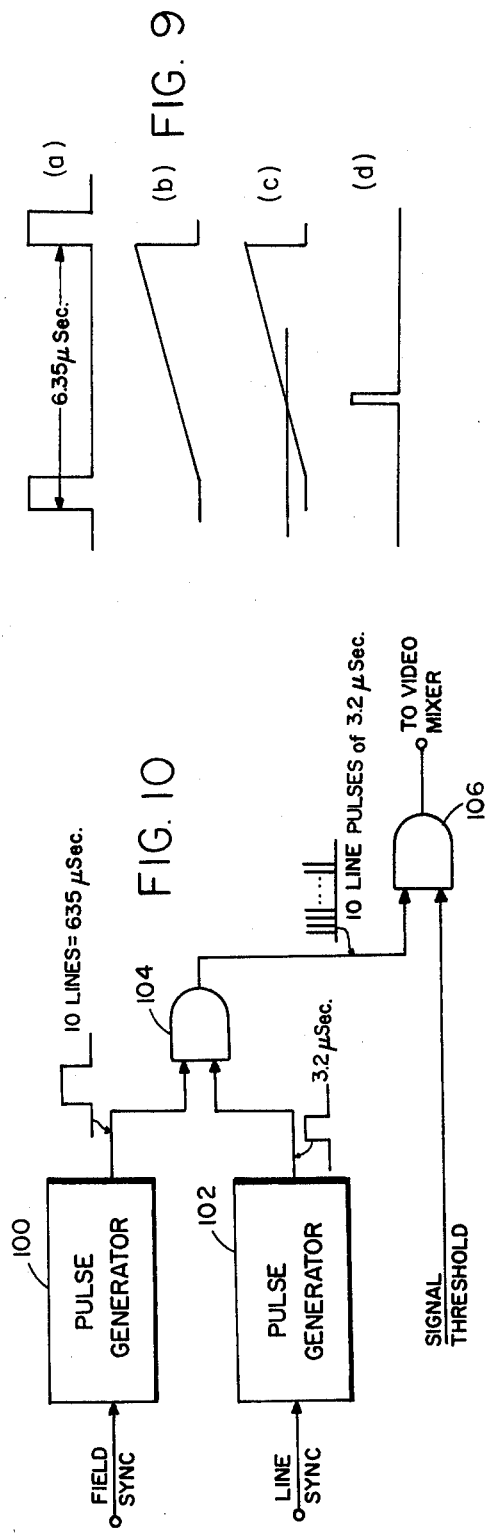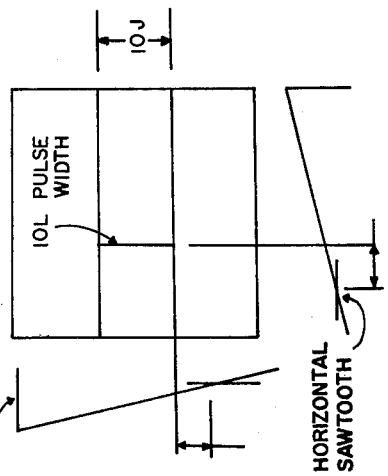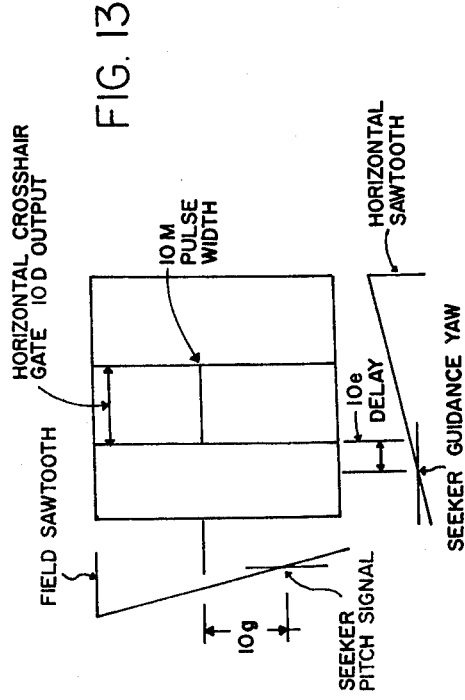

TELEVISION TRACKING SYMBOL GENERATOR

BACKGROUND OF THE INVENTION

During the testing of airborne guidance and control systems it is usually necessary to record a number of simultaneous dynamic signals from the equipment being tested. At the same time it is necessary to record the positions and attitudes of the moving targets and/or the test platform itself. These records are usually taken on multi-channel chart recorders. The analysis and interpretation of this data is time consuming and does not lend itself a quick understanding of the test results.

SUMMARY OF THE INVENTION

A novel technique is disclosed to provide a simple and economic means of electronically adding visual markers and tracking symbols to a television image. The primary application of this technique is for use in field flight testing of airborne guidance and control systems. The present invention provides for the integration of the real-time dynamic signals, such as seeker guidance signals, platform position signals and target signal strength (acquisition logic) into a composite video signal. These significant signals then are shown as dynamic signals, together with a dynamic target image on a television display.

Accordingly, an object of the invention is to provide a novel television tracking symbol generator.

Another object of the invention is the provision of a novel television tracking symbol generator system wherein the integration of multiple moving (or tracking) cross-hairs and indicators into a television picture used for the captive flight testing of non-imaging seekers.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 1 is a typical RF seeker block diagram;

FIG. 2 shows a test configuration utilizing the invention;

FIGS. 3 through 6 are displays showing the crosshairs and symbol generators as they would appear on the TV monitor of FIG. 2;

FIG. 9 shows the large vertical crosshair generator waveform;

FIG. 10 is a block diagram of the signal strength indicator generator;

FIGS. 12 and 13 are TV pictures showing respective timing in the small crosshair generator of FIG. II.

DESCRIPTION OF THE PREFERRED EMBODIMENTS

Figure 7:
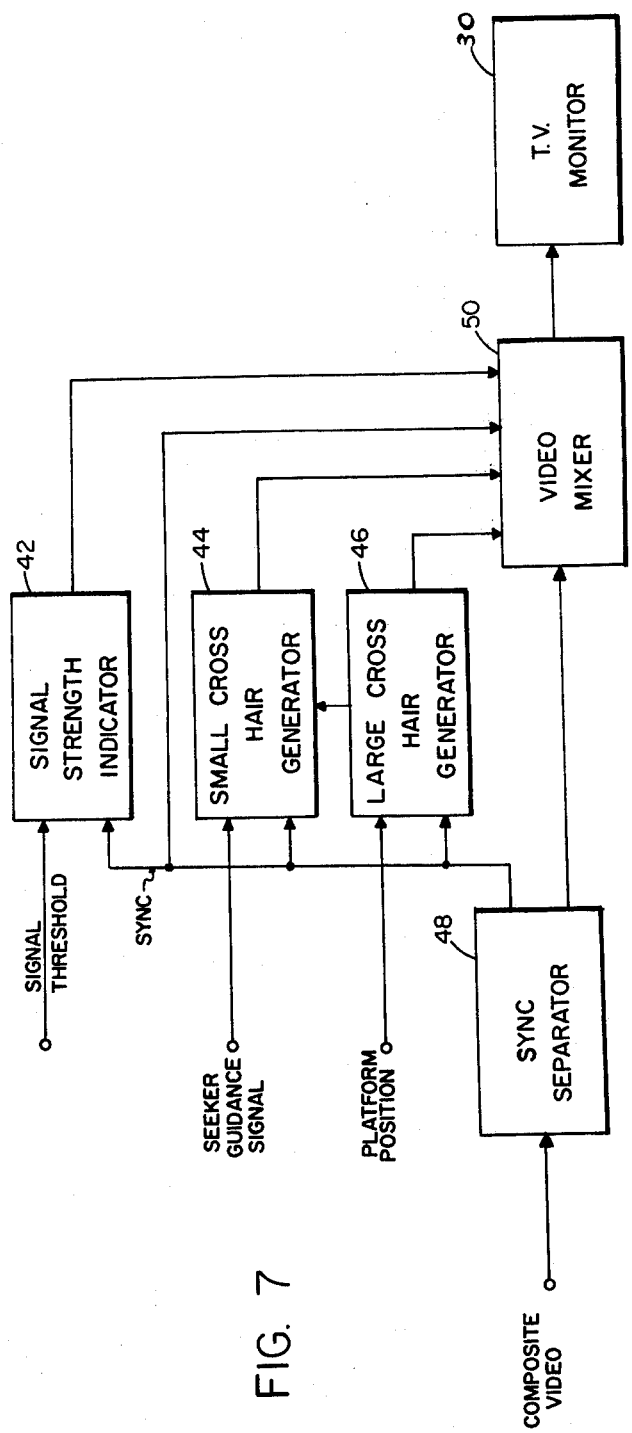
FIG. 7 is a block diagram of the symbol generator of FIG. 2.

Referring now to the drawings wherein there is shown in FIG. 1 that portion of a typical airborne seeker for a system which acquires and tracks other airborne targets radiating RF energy. This portion of the airborne seeker is provided to show the source of the signals utilized in the present invention. For example, received signal strength is provided by the output of the RF sensor 10, the tracking error signal is provided by the output from the guidance processor 12 and a position signal is provided by the output from the stabilized platform 14.

Referring to FIG. 2 wherein there is shown the overall implementation of the invention in a typical test situation an RF seeker antenna 16 mounted on a stabilized platform 18 and receives RF radiated energy from a target 20 which is fed to an RF seeker electronics portion 22. Tracking error and signal strength signals are provided by seeker 22 while the platform position signal is provided by the stabilized platform 18. These three signals are fed to television tracking symbol generator 24 which has an additional TV video input from TV sensor 26. Sensor 26 has a field of view that includes target 20. In accordance with the teachings of the present invention symbol generator 24 provides outputs to TV display 30 for displaying the information as shown in FIGS. 3 – 6. This information also is recorded on the video tape recorder 32.

The small crosshair 34 (FIG. 3–6) is driven by the seeker guidance signal and shows the location of the seeker's aim point. The large crosshair 36 is driven by the platform pitch and yaw signal and shows the platform orientation. The dark bar or square 38 in one corner of the display is controlled by the signal strength and indicates whether the target signal strength is above an operable threshold level. These symbols 34, 36, and 38 are simultaneously displayed together with the target 40 in the same frame of the picture. As can be seen the displayed picture contains the key performance data presented in such a way that their relationship can be simultaneously compared. For example, in FIG. 4 the seeker guidance command and antenna platform are tracking the target 12, both crosshairs 34 and 36 are perfectly superimposed with the airplane target 40. FIG. 5 shows that the platform 18 is not moving as rapidly as the seeker and lags behind the target due to mechanical inertia or other problems. FIG. 6 shows that the signal strength falls below the operable threshold, the seeker and platform are no longer able to track the airplane target, and crosshairs 34 and 36 have returned to their center position.

FIG. 7 shows the overall block diagram of the television tracking symbol generator 24 of FIG. 2 and is made up of three major sections, the signal strength indicator circuit 42, the small crosshair generator circuit 44 and the large crosshair generator circuit 46. The signal strength indicator circuit 42 provides an output signal when the video input exceeds the signal input threshold value. Small crosshair generator circuit 44 utilizes seeker guidance information to generate the small crosshair generator signal. The large crosshair generator 46 uses the platform position information to generate a large crosshair signal. The three outputs from the three signal generators along with the signal from sync separator 48 is fed into a video mixer 50 which provides a composite video format that can be displayed on a conventional TV monitor 30.

Figure 8:
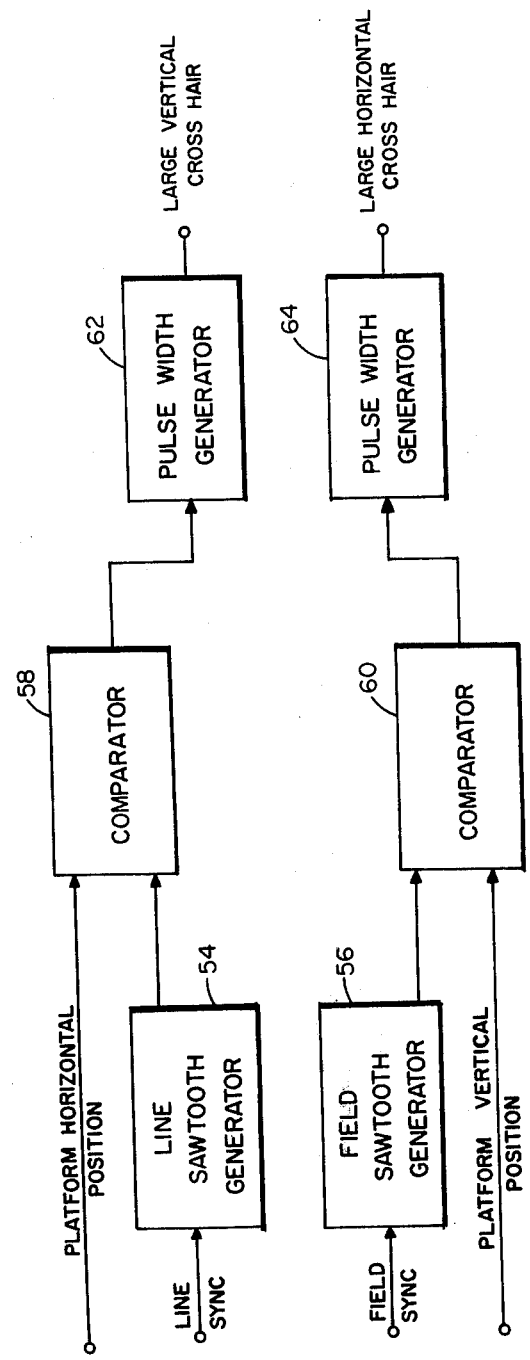
FIG. 8 is a block diagram of the large crosshair generator.

Large crosshair generator circuit 46 as shown in more detail in FIG. 8 consists of a line sawtooth generator 54, field sawtooth generator 56 comparators 58, 60 and pulse width generators 62 and 64. The generation of the large crosshair signals can best be understood by referring to the waveform of FIG. 9. As the composite video signal is received by sync separator 46 from the TV sensor 26 (FIG. 2), the line and field sync pulses are separated from the video signal. The line sync pulses are separated from the video signal. The line sync pulses (FIG. 9(a)) trigger line sawtooth generator 54 to generate line sawtooth (FIG 9(b)). The sawtooth waveform out of line sawtooth generator 54 is fed as one input to comparator 58, the other input to comparator 58 is a voltage representing the horizontal position of platform 18. When the sawtooth waveform reaches the value of the voltage repesenting the platform horizontal position (FIG. 9(c)) an output signal from comparator 58 triggers a pulse width generator 62 to provide an output pulse (FIG. 9(d)). Since the line sawtooth shown in FIG. 9 is a voltage waveform that is monotonically increasing during the period of one TV line period, the voltage level of this sawtooth represents the instantaneous horizontal position across the line. When the pulse waveform (d), FIG. 9 is displayed on the TV monitor 30, it is the vertical line of the large crosshair 36. Similarly, the field sawtooth generator 56 generates a vertical sawtooth. The voltage of this waveform represents the instantaneous vertical position during a TV frame. The voltage level from the platform pitch signal when compared with the field sawtooth determines a position of a horizontal member of the large crosshair 36.

Figure 11:
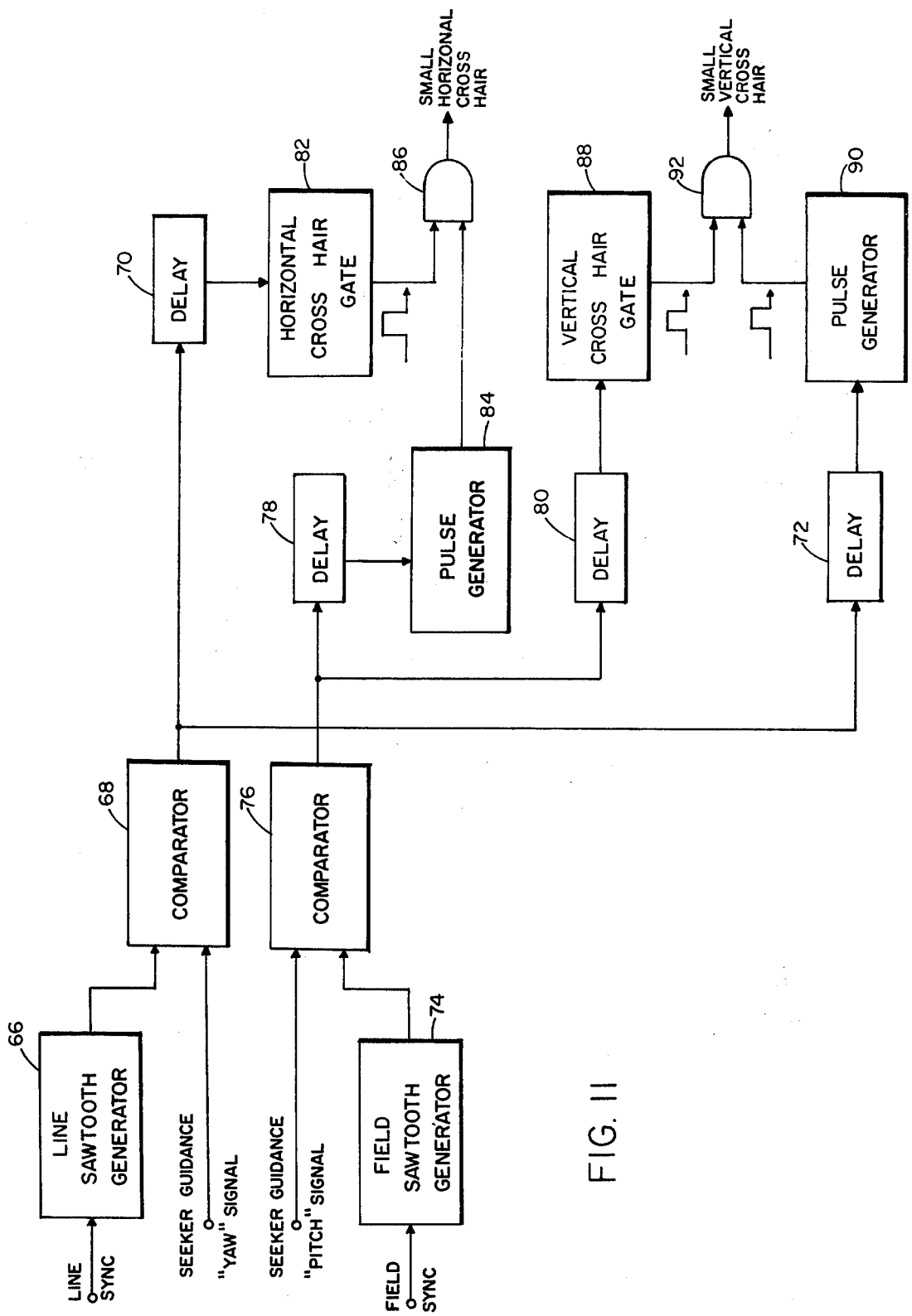
FIG. 11 is a block diagram of the small crosshair generator.

Referring now to FIG. 11 which shows the detail block diagram for generating the small crosshair 34. The associated timing waveforms are shown in FIGS. 12 and 13. Sawtooth generator 66 is triggered by the line sync signal to generate a sawtooth waveform. The seeker guidance yaw signal is fed to comparator 68 where it is compared with the sawtooth waveform. At the point of coincidence an output pulse is fed from comparator 68 to delay circuits 70 and 72. The field sync signal triggers sawtooth generator 74 which generates a sawtooth wave output that is compared in comparator 76 with the level of the seeker guidance pitch signal. The output from comparator 76 is fed to delay lines 78 and 80. The basic principle of generating the small crosshair is similar to that for generating the large crosshair. In order to restrict the size of the crosshairs, a movable horizontal crosshair gate is generated by gate generator 82. This controls the length of the horizontal member of the small crosshairs. The movement of the horizontal crosshair gate must be in synchronism with the vertical member of the small crosshair. The movable gate (output signal from gate 82) is generated by comparing the line sawtooth and the seeker yaw guidance in comparator 68. The output from comparator 76 is fed through delay circuit 78 to trigger pulse generator 84. The outputs of gate circuit 82 and pulse generator 84 are fed to AND gate 86, the output of which is the small horizontal crosshair. In a similar manner the vertical crosshair is synchronized with the horizontal member of the small crosshair by feeding the output of comparator 76 through delay circuit 80 to trigger gate circuit 88. The movable crosshair gate out of gate generator 88 is fed as one input to AND gate 92. The output pulse from comparator 68 is fed through delay line 72 and triggers pulse generator 90 to provide an output pulse which is also fed to AND gate 92/ The output from AND gate 92 is the small vertical crosshair.

The signal strength (acquisition) indicator is located in the corner of the TV display and appears as a black square when the received target signal strength is above a predetermined threshold (FIGS. 4 and 5). For purposes of illustration the square has a height of 10 TV lines and a width of about 5% of the horizontal line time, or 3.2 microseconds. The circuit for generating the symbol is shown in FIG. 10. The field sync pulse triggers a pulse generator 100 to generate a 635 microsecond pulse. The line sync pulse is used to trigger another pulse generator 102 to generate a 3.2 microsecond pulse. These signals are combined in AND gate 104 to produce the equivalent of 10 black TV lines with a width of 3.2 microseconds. This combined signal is fed to video mixer 50 (FIG. 7) when the sync acquisition signal is also present at the input of the controlling AND gate 106.

Obviously many modifications and variations of the present invention are possible in the light of the above teachings. It is therefore to be understood that within the scope of the appended claims the invention may be practiced otherwise than as specifically described.

What is claimed is:

1. A television tracking symbol generator for use in flight testing of airborne seeker systems which acquire and track airborne targets radiating RF energy and provides signals proportional to the received signal strength, tracking error signals and platform position signals comprising:
   a. a first circuit means for generating a first video signal to form a first video symbol in response to a received signal above a predetermined value,
   b. a second circuit means for generating a second video signal to form a second video symbol in response to the tracking error signal from the seeker,
   c. a third circuit means for generating a third video signal to form a third video symbol in response to a signal representing the relative position of the seeker stabilized platform,
   d. video signal mixer circuit means coupled to said first, second and third circuit means for combining said first, second and third video signals into a composite video signal for displaying said first, second and third video symbols on a television monitor.

2. The system of claim 1 wherein said first circuit means includes:
   a. a first pulse generator for generating a first pulse of a predetermined time duration in response to the field sync portion of the video signal,
   b. a second pulse generator for generating a second pulse having a time duration that is a fraction of the time duration of said first pulse,
   c. a first AND gate coupled to said first and second pulse generators for providing a plurality of said second pulses for the duration of said first pulse,
   d. a second AND gate coupled to the output of said first AND gate and having a second input coupled to a threshold voltage and providing an output of said plurality of pulses when said threshold voltage is of a predetermined value.

3. The system of claim 2 wherein said second circuit means includes:
   a. a first sawtooth voltage generator for generating a first sawtooth voltage when triggered by the line sync pulse,
   b. a second sawtooth voltage generator for generating a second sawtooth voltage when triggered by the field sync pulse,
   c. a first comparator circuit having a first input coupled to the output of said first sawtooth voltage generator a second input coupled to the yaw guidance signal output of the seeker for generating an output pulse when said first and second inputs are equal, d. a second comparator circuit having a first input coupled to the output of said second sawtooth voltage generator, a second input coupled to the pitch guidance signal output of the seeker for generating an output pulse when said second sawtooth voltage and said pitch guidance signals are equal, e. a horizontal crosshair gate generator having an input coupled through a delay circuit to the output of said first comparator circuit for generating a horizontal crosshair pulse, f. a vertical crosshair gate generator having an input coupled through a delay circuit to the output of said second comparator circuit for generating a vertical crosshair pulse, g. and synchronizing means coupled to the ooutputs of said first and second comparator circuits for synchronizing said horizontal and vertical crosshair pulses.

4. The system of claim 1 wherein said second circuit means includes:

a. a first sawtooth voltage generator for generating a first sawtooth voltage when triggered by the line sync pulse, b. a second sawtooth voltage generator for generating a second sawtooth voltage when triggered by the field sync pulse, c. a first comparator circuit having a first input coupled to the output of said first sawtooth voltage generator a second input for receiving the yaw guidance signal output of the seeker for generating an output pulse when said first and second inputs are equal, d. a second comparator circuit having a first input coupled to the output of said second sawtooth voltage generator, a second input for receiving the pitch guidance signal output of the seeker for generating an output pulse when said second and first inputs are equal, e. a horizontal crosshair gate generator having an input coupled through a delay circuit to the output of said first comparator circuit for generating a horizontal crosshair pulse, f. a vertical crosshair gate generator having an input coupled through a delay circuit to the output of said second comparator circuit for generating a vertical crosshair pulse, g. and synchronizing means coupled to the outputs said first and second comparator circuits for synchronizing said horizontal and vertical crosshair pulses.

5. The system of claim 4 wherein said third circuit means includes:

a. a first sawtooth voltage generator for generating a sawtooth voltage when triggered by the line sync pulse, b. a second sawtooth voltage generator for generating a sawtooth voltage when triggered by the field sync pulse, c. a first comparator circuit having a first input coupled to the output of said first sawtooth voltage generator, a second input for receiving a signal proportional to the platform horizontal position and generating an output pulse when the two input signals are equal, d. a second comparator circuit having a first input coupled to the output of said second sawtooth voltage generator and a second input for receiving a signal proportional to the platform vertical position and generating an output pulse when the two input signals are equal, e. a first pulse width generator coupled to the output of said first comparator circuit for generating a vertical video pulse that is one line in width, f. a second pulse width generator coupled to the output of said second comparator circuit for generating a horizontal video pulse that is one line in width.

6. The system of claim 1 wherein said third circuit means includes, a. a first sawtooth voltage generator for generating a sawtooth voltage when triggered by the line sync pulse, b. a second sawtooth voltage generator for generating a sawtooth voltage when triggered by the field sync pulse, c. a first comparator circuit having a first input coupled to the output of said first sawtooth voltage generator, a second input for receiving a signal proportional to the platform horizontal position and generating an output pulse when the two input signals are equal, d. a second comparator circuit having a first input coupled to the output of said second sawtooth voltage generator and a second input for receiving a signal proportional to the platform vertical position and generating an output pulse when the two input signals are equal, e. a first pulse width generator coupled to the output of said first comparator circuit for generating a vertical video pulse that is one line in width, f. a second pulse width generator coupled to the output of said second comparator circuit for generating a horizontal video pulse that is one line in width.

* * * * *